United States Patent [19]

Oba et al.

[11] Patent Number: 5,523,355
[45] Date of Patent: Jun. 4, 1996

[54] CHLOROPRENE RUBBER COMPOSITION HAVING A HIGH DAMPING PERFORMANCE AND METHOD FOR ITS PRODUCTION

[75] Inventors: Hiroaki Oba; Kazuomi Aoki, both of Niigata-ken; Kenji Itoyama, Kawasaki, all of Japan

[73] Assignee: Denki Kagaku Kogyo Kabushiki Kaisha, Tokyo, Japan

[21] Appl. No.: 427,849

[22] Filed: Apr. 26, 1995

[30] Foreign Application Priority Data

Apr. 27, 1994 [JP] Japan .................................. 6-089814
Apr. 27, 1994 [JP] Japan .................................. 6-089815
Apr. 27, 1994 [JP] Japan .................................. 6-089816

[51] Int. Cl.$^6$ .................................................. C08L 11/00
[52] U.S. Cl. .......................................... 525/215; 525/196
[58] Field of Search ............................................. 525/215

[56] References Cited

U.S. PATENT DOCUMENTS 2,877,200  3/1959  Carpenter .
3,147,318  9/1964  Carrcroft .................................. 525/215

FOREIGN PATENT DOCUMENTS 041470   12/1971  Japan .................................. 525/215
041745   4/1976   Japan .
167334   10/1982  Japan .
1148690  4/1969   United Kingdom .................. 525/215

*Primary Examiner*—David Buttner
*Attorney, Agent, or Firm*—Oblon, Spivak, McClelland, Maier & Neustadt

[57] ABSTRACT

A chloroprene rubber composition having a high damping performance, comprising a solid chloroprene polymer and a low molecular weight chloroprene polymer having a number average molecular weight of from 500 to 50,000, obtained by polymerization in the presence of an alkylmercaptan and/or a mercaptoalcohol.

5 Claims, No Drawings

CHLOROPRENE RUBBER COMPOSITION HAVING A HIGH DAMPING PERFORMANCE AND METHOD FOR ITS PRODUCTION

The present invention relates to a chloroprene ruber composition which is capable of efficiently absorbing vibrational energy and a method for producing it.

In recent years, vibrational energy absorbing apparatus, such as vibration proof apparatus, damping apparatus and seismic isolator, have found rapidly wide spread use. For example in seismic isolation to protect buildings from earth quakes, rubber bearings for seismic isolator have been used. They are designed so that rubber layers and steel plates are alternately laminated to absorb vibrational energy by earth quakes between the ground and the buildings. However, with conventional rubber bearings for seismic isolator, the damping performance of the rubber composition itself is inadequate, and the vibrational energy absorbing effects are small, and accordingly, a viscous damper or the like has been employed to absorb vibration. Therefore, they have had problems such that the structure is complex, and the costs are high.

As a means to evaluate the damping performance of a rubber composition, it is common to use a loss factor (tanδ=loss modulus/storage modulus) obtainable by the measurement of viscoelasticity of the material. It is judged in such a way that the larger the loss factor, the higher the damping performance. As a rubber having a high damping performance, butyl rubber is most well known, but it has problems that it has a high compression set and is likely to be readily fatigued, it is poor in the processability, and its vulcanization rate is low. Accordingly, its field of application has been rather limited.

On the other hand, chloroprene rubber is excellent in physical properties including common rubber properties, weather resistance, heat resistance and cold resistance, and it is excellent in the balance of such physical properties. Accordingly, it is known as a rubber material for rubber bearings for seismic isolator, and it is used, for example, for rubber bearings for a road bridge. However, chloroprene rubber is inadequate in its damping performance, and it has been desired to improve the damping performance.

As a means to improve the damping performance of chloroprene rubber, Japanese Unexamined Patent Publication No. 245449/1988 discloses a chloroprene rubber composition for vibration proof rubber which comprises a chloroprene polymer and a liquid chloroprene polymer having a number average molecular weight of from 500 to 20,000 polymerized in the presence of a xanthogen disulfide compound. However, this proposal has a problem that due to the incorporation of a liquid chloroprene polymer, the modulus of elasticity decreases. Accordingly, the amount of the liquid chloroprene polymer is inevitably limited, whereby no adequate damping performance can be obtained.

It is an object of the present invention to provide a chloroprene rubber composition which is excellent in the damping performance as compared with the conventional composition, while maintaining the excellent properties of chloroprene rubber such as the common rubber properties, weather resistance, heat resistance and cold resistance.

The present inventors have conducted extensive researches to solve the above mentioned problems and as a result, have found that a chloroprene rubber composition comprising a solid chloroprene polymer and a low molecular weight chloroprene polymer polymerized in the presence of a certain specific compound, is excellent in the damping performance as compared with the conventional chloroprene rubber composition having a liquid chloroprene polymer incorporated.

Further, they have found that a composition obtained by producing a high molecular weight chloroprene polymer having a molecular weight higher than a certain level and a low molecular weight chloroprene polymer polymerized in the presence of a certain specific compound, respectively, by emulsion polymerization and mixing them in an emulsified state, exhibits a high damping performance like the conventional composition obtained by incorporating a liquid chloroprene polymer to a solid chloroprene polymer, and it is free from difficulties in mixing a solid product and a liquid product.

Thus, the present invention provides a chloroprene rubber composition having a high damping performance, comprising a solid chloroprene polymer and a low molecular weight chloroprene polymer having a number average molecular weight of from 500 to 50,000, obtained by polymerization in the presence of an alkylmercaptan and/or a mercaptoalcohol.

Further, the present invention provides a method for producing a chloroprene rubber composition having a high damping performance, which comprises producing a solid chloroprene polymer and a low molecular weight chloroprene polymer having a number average molecular weight of from 500 to 50,000, obtained by polymerization in the presence of an alkylmercaptan and/or a mercaptoalcohol, respectively, by emulsion polymerization, and then mixing them in an emulsified state.

Now, the present invention will be described in detail with reference to the preferred embodiments.

In the present invention, both polymers of a solid chloroprene polymer and a low molecular weight chloroprene polymer are a homopolymer of 2-chloro-1,3-butadiene or a copolymer of 2-chloro-1,3-butadiene with another monomer. Here, another monomer is not particularly limited so long as it is copolymerizable with 2-chloro-1,3-butadiene. For example, it may be styrene, acrylonitrile, 2,3-dichloro-1,3-butadiene, 1-chloro- 1,3-butadiene, acrylic acid, an acrylic acid ester, methacrylic acid, a methacrylic acid ester, isoprene or 1,3-butadiene.

The solid chloroprene polymer in the present invention is solid at room temperature and may be a common vulcanizable rubber. However, when high levels of common rubber properties, compression set properties, etc. are required, a polymer of a high molecular weight is preferred. For example, a polymer having a number average molecular weight of at least 100,000 is preferred. More preferred is the one having a number average molecular weight of at least 150,000.

The low molecular weight chloroprene polymer in the present invention is a polymer having a number average molecular weight of from 500 to 50,000, obtainable by polymerization in the presence of an alkylmercaptan and/or a mercaptoalcohol. However, taking the balance of physical properties into consideration, the one having a number average molecular weight of from 20,000 to 50,000 is preferred. If the number average molecular weight is outside the range of from 500 to 50,000, the effect of improving the damping performance is low.

The alkylmercaptan is a compound containing at least one mercapto group in its molecule, and it may be, for example, methylmercaptan, ethylmercaptan, n-butylmercaptan, n-octylmercaptan, n-dodecylmercaptan or t-dodecylmercaptan. However, it is by no means limited to such specific examples. The mercaptoalcohol is a compound containing at least one mercapto group and at least one hydroxyl group in its molecule, and it may, for example, be 2-mercapto-1-ethanol, 3-mercapto-1-propanol, 4-mercapto-1-butanol, 2-mercaptocyclohexynol or 3-mercapto- 1,2-propanediol. However, it is by no means limited to such specific examples.

The molecular terminals of the low molecular weight chloroprene polymer obtained by polymerization in the presence of an alkylmercaptan and/or a mercaptoalcohol, are alkyl groups and/or hydroxyl groups which are chemically stable and substantially non-reactive even during the vulcanization. On the other hand, in the case of the conventional low molecular weight chloroprene polymer obtained by polymerization in the presence of a xanthogen disulfide compound, the molecular terminals of the polymer are reactive xanthogen terminals, and it is believed that no adequate effect of improving the damping performance can be obtained since the molecular terminals undergo crosslinking reaction during the vulcanization. For this reason, it is believed that excellent damping performance can be obtained when a low molecular weight chloroprene polymer wherein the molecular terminals are alkyl groups and/or hydroxyl groups which are chemically stable and substantially non-reactive even during the vulcanization of rubber, is used as the low molecular weight chloroprene polymer.

With the chloroprene rubber composition of the present invention, the larger the content of the low molecular weight chloroprene polymer in the chloroprene rubber composition, the more distinctive the effect of improving the damping performance. Whereas, the tensile strength and the modulus of elasticity tend to gradually decrease. Therefore, it is advisable to properly control the content depending upon the desired properties. Especially when high levels of tensile properties, elastic modulus and damping performance are required at the same time, the weight ratio of the solid chloroprene polymer/the low molecular weight chloroprene polymer is preferably within a range of from 50/50 to 90/10, more preferably from 60/40 to 80/20.

To obtain the chloroprene rubber composition of the present invention, the solid chloroprene polymer and the low molecular weight chloroprene polymer may be mixed in the form of the respective latexes obtained by emulsion polymerization, or may be mixed in the form of their solutions in e.g. toluene, or may be mixed by a roll mill or a Banbary mixer. However, in the present invention, it is preferred to mix them in the form of their latexes. By this method, a chloroprene polymer having an extremely high molecular weight and a chloroprene polymer having an extremely low molecular weight can easily be mixed in an optional ratio. When a low molecular weight chloroprene polymer having a number average molecular weight of from 500 to 50,000 is to be prepared alone, a special production step is usually required (for example, Japanese Unexamined Patent Publication No. 85292/1979). Whereas, when it is to be mixed in the form of a latex, it can be produced by a usual method.

Further, it is also possible to change the amount of the chain transfer agent during the polymerization to control the ratio of the high molecular weight polymer to the low molecular weight polymer so as to obtain a ruber having a high damping performance in one step.

The emulsion polymerization can be carried out by a conventional method. As the polymerization initiator, a peroxide, an azo-type compound, a persulfate or a conventional radical initiator such as a redox initiator may be employed.

Further, as the emulsifier, an anionic, cationic, nonionic or amphoteric surfactant may be employed. Specific examples of such a surfactant include a fatty acid salt such as sodium oleate, rosin and a rosin derivative, a sulfuric acid ester such as sodium laurly sulfate, an alkyl benzene sulfonate such as sodium dodecyl benzene sulfonate, an aryl sulfonate, a condensation product of an aryl sulfonate with formaldehyde, polyethylene glycol, an alkyl ester of polyethylene glycol, and polyvinyl alcohol. These surfactants may be used alone or in combination as a mixture. To control the molecular weight of the high molecular weight chloroprene polymer of the present invention, a well known molecular weight controlling agent may be used. Specific examples of such a molecular weight controlling agent include alkyl mercaptans such as methylmercaptan, ethylmercaptan, n-butylmercaptan, n-octylmercaptan, n-dodecylmercaptan and t-dodecylmercaptan, mercaptoalcohols such as 2-mercapto-1-ethanol, 3-mercapto-1-propanol, 4-mercapto-1-butanol, 2-mercaptocyclohexanol and 3-mercapto-1,2-propanediol, xanthogen disulfide, and halogenated hydrocarbons such as carbon tetrachloride. To control the molecular weight of the low molecular weight chloroprene polymer, an alkylmercaptan and/or a mercaptoalcohol may be used as mentioned above.

The chloroprene rubber composition of the present invention is vulcanized for use by an addition of a vulcanizer. Further, a filler such as carbon black, silica or clay as well as a process oil, a plasticizer, an age-preventing agent and a lubricant, may also be incorporated. Further, if necessary, other resins or rubbers may be blended to such an extent not to impair the physical properties. The blending method and the vulcanization method are not particularly limited, and operational methods common to rubbers may be employed.

With the chloroprene rubber composition of the present invention, excellent damping performance can be obtained without impairing the characteristic physical properties of chloroprene ruber such as common rubber properties, weather resistance, heat resistance and cold resistance, and it is suitable for use for a rubber bearing for seismic isolation of a building or a road bridge. It is also suitable for a part intended to absorb vibration energy in the precision electronic field and in the automobile field. Further, according to the present invention, a chloroprene rubber composition having such a high damping performance can be readily produced on an industrial scale.

Now, the present invention will be described in further detail with reference to Examples. However, it should be understood that the present invention is by no means restricted by such specific Examples.

PREPARATION EXAMPLE 1

(1) Low Molecular Weight Chloroprene Polymer (B1)

Into a 5 l four-necked flask equipped with a stirrer, a solution comprising 90 parts by weight of 2-chloro-1,3-butadiene, 10 parts by weight of 2,3-chloro-1,3-butadiene, 25 parts by weight of toluene and 12 parts by weight of n-dodecylmercaptan as an alkylmercaptan, was charged and heated to 55° C. Then, 1.5 parts by weight of a toluene solution containing 0.5 wt % of α,α'-azobis-2,4-dimethylvaleronitrile as a polymerization initiator, was added thereto to initiate the reaction. Polymerization was continuated at 55° C., and 15 hours later, 1 part by weight of a toluene solution containing 0.02 wt % of p-tert-butyl catechol, was added thereto to terminate the polymerization. The polymerization degree of 2-chloro- 1,3-butadiene was 72%. Then, a large excess amount of methanol was added thereto, and the polymer was isolated. Then, purification operation comprising dissolution in benzene and solidification with methanol, was repeated three times. Then, the remaining solvent was evaporated at 110° C. under 1 to 2 mmHg abs by means of a thin membrane evaporator to isolate a polymer. This polymer was designated as B1.

(2) Low Molecular Weight Chloroprene Polymer (B2)

A polymer was prepared in the same manner as in Preparation Example (1) except that instead of 12 parts by weight of n-dodecylmercaptan, 4 parts of 2-mercaptoethanol was used as a mercaptoalcohol. This polymer was designated as B2.

(3) Low Molecular Weight Chloroprene Polymer (B3)

A polymer was prepared in the same manner as in Preparation Example (1) except that instead of n-dodecylmercaptan, 18 parts by weight of diisopropylxanthogen disulfide was used. This polymer was designated as B3.

(4) Method for Measuring the Number Average Molecular Weights of Low Molecular Weight Chloroprene Polymers The number average molecular weights of chloroprene polymers B1 to B3 were determined as calculated as styrene by a GPC (gel permeation chromatography) method, and the results are shown in Table 1.

PREPARATION EXAMPLE 2

(1) Preparation of Solid Chloroprene Polymer (A1)

Using a 5 l four-necked flask as a reactor, emulsion polymerization was carried out under the polymerization condition as identified in Table 2 while continuously dropwise adding potassium persulfate in a nitrogen atmosphere. When the polymerization degree reached 65%, 100 ppm of diethylhydroxylamine was immediately added to the charged total monomers to terminate the polymerization reaction. Unreacted monomers were removed by steam stripping.

Method for Measuring the Molecular Weight of Solid Chloroprene Polymer (A1)

The number average molecular weight of the chloroprene polymer obtained in (1) was determined as calculated as styrene by a GPC (gel permeation chromatography) method.

EXAMPLE 1

Using polymer A1 as the solid chloroprene polymer and polymer B1 as the low molecular weight chloroprene polymer, kneading was carried out with the blend composition as identified in Table 3 (numerical values are parts by weight) by means of an open roll kneader, followed by press vulcanization at 150° C. for 20 minutes to obtain a vulcanized sheet having a thickness of 2 mm.

EXAMPLE 2

A vulcanized sheet was prepared in the same manner as in Example 1 except that B2 was used as the low molecular weight chloroprene polymer.

COMPARATIVE EXAMPLE 1

A vulcanized sheet was prepared in the same manner as in Example 1 except that B3 was used as the low molecular weight chloroprene polymer.

COMPARATIVE EXAMPLE 2

A vulcanized sheet was prepared in the same manner as in Example 1 except that A1 was used as the solid chloroprene polymer and no low molecular weight chloroprene polymer was used.

Method for Measuring the Physical Properties of Vulcanized Rubbers

The tensile strength ($kgf/cm^2$), the elongation at break (%), the hardness (JIS-A) (point) and the compression set (CS) were measured in accordance with JIS K 6301.

The static shearing modulus (GS) ($kgf/cm^2$) was calculated by the following formula after determining the stress at 25% extension in accordance with the low extension stress test of JIS K 6301.

Static shearing modulus (GS)=stress at 25% elongation× 1.639

The loss factor ($\tan\delta$) was determined in such a manner that a test specimen having a length of 38 mm, a width of 4 mm and a thickness of 2 mm was punched out from the vulcanized sheet, and the loss factor was measured at room temperature (23° C.) with an amplitude of ±1% with a preliminary load of 30 g at frequencies of 0.5 Hz and 15Hz by means of Rheovibron DDV-25F (manufactured by Orientec Company) which is a viscoelasticity measuring apparatus.

The results of measuring the above physical properties are shown in Table 4. From the results of Examples and Comparative Examples, it is evident that by using a low molecular weight chloroprene polymer, $\tan\delta$ is improved to a large extent, and the effect of improving the damping performance is observed. Further, it is evident that when a low molecular weight chloroprene polymer is used, the effect of improving the damping performance is excellent and the compression set is also excellent in a case where the one having a hydroxyl terminal and an alkyl terminal, is used over a case where the one having xanthogen terminals is used.

EXAMPLES 3 TO 6 AND COMPARATIVE EXAMPLE 3

Chloroprene polymers polymerized with the compositions as identified in Table 2 in accordance with the methods of Preparation Examples 1 and 2, were mixed in an emulsified state in the proportions as identified in Table 5. The respective mixtures of chloroprene polymers thus obtained were kneaded with the blend composition as identified in Table 6 by an open roll kneader, followed by press vulcanization at 150° C. for 20 minutes to obtain vulcanized sheets each having a thickness of 2 mm.

COMPARATIVE EXAMPLE 4

Using A1 as the high molecular weight polymer and B3 as the low molecular weight polymer, kneading was carried out with the blend composition as identified in Table 7 by an open roll kneader, followed by press vulcanization at 150° C. for 20 minutes to obtain a vulcanized sheet having thickness of 2 mm.

With respect to Examples 3 to 6 and Comparative Examples 3 to 4, processability in compounding in the kneading operation by the open roll is shown Table 8.

From Table 8, it is evident that the chloroprene rubber compositions of the present invention have large values of $\tan\delta$ as the index for the damping performance. Further, in Comparative Example 4 wherein a liquid polymer was incorporated, mixing required a long time, and the liquid polymer was a viscous liquid which was difficult to handle. Whereas, in the present invention, blending can be conducted in the same manner as usual chloroprene rubber without such problems.

As described in the foregoing, the chloroprene rubber composition produced by the present invention simultaneously has excellent physical properties such as damping performance, modulus of elasticity and common rubber properties. Accordingly, such a chloroprene rubber composition not only satisfies common rubber properties, weather resistance, heat resistance and cold resistance which are required for a rubber bearings for seismic isolator but also is excellent in the damping performance, and thus it is most suitable as a rubber bearings for seismic isolator without requiring a viscous damper which used to be required.

Further, the chloroprene rubber composition of the present invention is superior in the damping performance to the conventional chloroprene rubber composition containing a liquid chloroprene polymer having a number average molecular weight of from 500 to 20,000, polymerized in the presence of a xanthogen disulfide compound.

TABLE 1

|  | B1 | B2 | B3 |
|---|---|---|---|
| Molecular terminals | Alkyl group | Hydroxyl group | Xanthogen |
| Number average molecular weight | 5,100 | 5,500 | 4,900 |

TABLE 2

|  |  | A1 | A2 | B4 | B5 | B6 | B7 |
|---|---|---|---|---|---|---|---|
| 2-Chloro-1,3-butadiene | (parts) | 95 | 95 | 90 | 90 | 90 | 90 |
| 2,3-Dichloro-1,3-butadiene | (parts) | 5 | 5 | 10 | 10 | 10 | 10 |
| Pure water | (parts) | 120 | 120 | 120 | 120 | 120 | 120 |
| Disproportionated potassium rosinate | (parts) | 4.0 | 4.0 | 4.0 | 4.0 | 4.0 | 4.0 |
| Sodium salt of β-Naphthalene sulfonic acid/formalin condensation product | (parts) | 0.6 | 0.6 | 0.6 | 0.6 | 0.6 | 0.6 |
| Sodium hydroxide | (parts) | 0.3 | 0.3 | 0.3 | 0.3 | 0.3 | 0.6 |
| n-Dodecylmercaptan | (parts) | 0.14 | 0.22 | 1 | 2 | 10 | 0.5 |
| Polymerization temperature | (°C.) | 40 | 40 | 10 | 10 | 10 | 10 |
| Number average molecular weight |  | 270,000 | 160,000 | 33,000 | 16,000 | 2,600 | 58,000 |

TABLE 3

|  | Example 1 | Example 2 | Comparative Example 1 | Comparative Example 2 |
|---|---|---|---|---|
| Solid chloroprene polymer A1 | 70 | 70 | 70 | 100 |
| Low molecular weight chloroprene polymer B1 | 30 | — | — | — |
| Low molecular weight chloroprene polymer B2 | — | 30 | — | — |
| Low molecular weight chloroprene polymer B3 | — | — | 30 | — |
| Stearic acid | 0.5 | 0.5 | 0.5 | 0.5 |
| MgO | 4 | 4 | 4 | 4 |
| HAF carbon black [1] | 40 | 40 | 40 | 40 |

TABLE 3-continued

|  | Example 1 | Example 2 | Comparative Example 1 | Comparative Example 2 |
|---|---|---|---|---|
| Silica [2] | 8 | 8 | 8 | 8 |
| Process oil [3] | 8 | 8 | 8 | 8 |
| Lubricant [4] | 4 | 4 | 4 | 4 |
| ZnO [5] | 5 | 5 | 5 | 5 |
| Accelerator 22S [6] | 1.2 | 1.2 | 1.2 | 1.2 |

(Notes)
[1] Manufactured by Asahi Black "Asahi #70"
[2] Manufactured by PPG Industries "Hi Sil 233"
[3] Manufactured by Yamafumi Yuka "LPO"
[4] Manufactured by Nippon Petroleum "Paraffin 130° F."
[5] Manufactured by Sakai Kagaku Kogyo "Aenka 1 gou"
[6] Manufactured by Kawaguchi Kagaku Kogyo "Accel 22S" (2-mercaptoimidazoline)

TABLE 4

|  |  | Example 1 | Example 2 | Comparative Example 1 | Comparative Example 2 |
|---|---|---|---|---|---|
| Low molecular weight chloroprene polymer |  | B1 | B2 | B3 | Nil |
| Molecular terminals |  | Alkyl group | Hydroxyl group | Xanthogen |  |
| Physical properties of vulcanized products |  |  |  |  |  |
| Tensile strength | (kgf/cm$^2$) | 163 | 159 | 173 | 210 |
| Elongation at break | (%) | 303 | 307 | 331 | 276 |
| Hardness (JIS-A) | (Point) | 70 | 69 | 69 | 72 |
| GS | (kgf/cm$^2$) | 12.3 | 12.1 | 11.9 | 18.2 |
| CS (100° C. × 22H) | (%) | 30 | 29 | 34 | 21 |
| tan δ |  |  |  |  |  |
| 0.5 Hz | (–) | 0.34 | 0.34 | 0.30 | 0.20 |
| 15 Hz | (–) | 0.35 | 0.35 | 0.31 | 0.21 |

TABLE 5

| Example 3 | A1/B4 = 70/30 |
| Example 4 | A1/B5 = 70/30 |
| Example 5 | A1/B6 = 70/30 |
| Example 6 | A2/B6 = 70/30 |
| Comparative Example 3 | A1/B7 = 70/30 |

TABLE 7

| A1 | 70 |
| B3 | 30 |
| Stearic acid | 0.5 |
| MgO | 4 |
| HAF carbon black [1] | 40 |
| Silica [2] | 8 |
| Process oil [3] | 8 |
| Lubricant [4] | 4 |
| ZnO [5] | 5 |
| Accelerator 22S [6] | 1.2 |

TABLE 8

|  |  | Example 3 | Example 4 | Example 5 | Example 6 | Comparative Example 3 | Comparative Example 4 |
|---|---|---|---|---|---|---|---|
| Number average molecular weight of solid polymer |  | 270,000 | 270,000 | 270,000 | 160,000 | 270,000 | 270,000 |
| Number average molecular weight of low molecular weight polymer |  | 33,000 | 16,000 | 2,600 | 2,600 | 58,000 | 4,900 |
| Processability in compounding |  | O | O | O | O | O | X |
| Physical properties of vulcanized products |  |  |  |  |  |  |  |
| Tensile strength | (kgf/cm$^2$) | 197 | 183 | 161 | 158 | 209 | 173 |
| Elongation at break | (%) | 289 | 303 | 395 | 404 | 298 | 331 |
| Hardness (JIS-A) | (Point) | 68 | 68 | 64 | 63 | 69 | 69 |
| GS | (kgf/cm$^2$) | 14.2 | 12.3 | 9.8 | 9.4 | 15.7 | 11.9 |
| CS (100° C. × 22H) | (%) | 28 | 30 | 30 | 33 | 25 | 34 |
| tanδ |  |  |  |  |  |  |  |
| 0.5 Hz | (–) | 0.33 | 0.33 | 0.34 | 0.34 | 0.25 | 0.30 |
| 15 Hz | (–) | 0.35 | 0.35 | 0.37 | 0.38 | 0.27 | 0.31 |

Efficiency in blending: O equal to usual chloroprene rubber
X blending is difficult and requires a long time.

TABLE 6

| Polymer | 100 |
| Stearic acid | 0.5 |
| MgO | 4 |
| HAF carbon black [1] | 40 |
| Silica [2] | 8 |
| Process oil [3] | 8 |
| Lubricant [4] | 4 |
| ZnO [5] | 5 |
| Accelerator 22S [6] | 1.2 |

We claim:

1. A chloroprene rubber composition having a high damping performance, consisting essentially of a solid chloroprene polymer having a number average molecular weight of at least 100,000 and a low molecular weight chloroprene polymer having a number average molecular weight of from 20,000 to 50,000, obtained by polymerization in the presence of an alkylmercaptan and/or a mercaptoalcohol, both polymers of said solid chloroprene polymer and said low molecular weight chloroprene polymer being a homopolymer of 2-chloro-1,3-butadiene or a copolymer of 2-chloro-1,3-butadiene with at least one monomer selected from the group consisting of styrene, acrylonitrile, 2,3-dichloro-1,3-butadiene, 1-chloro-1,3-butadiene, acrylic acid, an acrylic acid ester, methacrylic acid, a methacrylic acid ester, isoprene and 1,3-butadiene.

2. The chloroprene rubber composition according to claim 1, wherein the solid chloroprene polymer has a number average molecular weight of at least 150,000.

3. The chloroprene rubber composition according to claim 1, wherein the blend weight ratio of the solid chloroprene polymer/the low molecular weight chloroprene polymer is within a range of from 50/50 to 90/10.

4. The chloroprene rubber composition according to claim 1, wherein the blend weight ratio of the solid chloroprene polymer/the low molecular weight chloroprene polymer is within a range of from 60/40 to 80/20.

5. A method for producing a chloroprene rubber composition having a high damping performance, which comprises producing a solid chloroprene polymer having a number average molecular weight at least 100,000 and a low molecular weight chloroprene polymer having a number average molecular weight of from 20,000 to 50,000, obtained by polymerization in the presence of an alkylmercaptan and/or a mercaptoalcohol, respectively, by emulsion polymerization, and then mixing them in an emulsified state, both polymers of said solid chloroprene polymer and said low molecular weight chloroprene polymer being a homopolymer of 2-chloro-1,3-butadiene or a copolymer of 2-chloro-1,3-butadiene with at least one monomer selected from the group consisting of styrene, acrylonitrile, 2,3-dichloro-1,3-butadiene, 1-chloro-1,3-butadiene, acrylic acid, an acrylic acid ester, methacrylic acid, a methacrylic acid ester, isoprene and 1,3-butadiene.

* * * * *